United States Patent
Kanstein et al.

(10) Patent No.: US 8,261,042 B2
(45) Date of Patent: Sep. 4, 2012

(54) RECONFIGURABLE MULTI-PROCESSING COARSE-GRAIN ARRAY

(75) Inventors: Andreas Kanstein, Munich (DE); Mladen Berekovic, Hemmingen (DE)

(73) Assignees: IMEC, Leuven (BE); Freescale Semiconductor, Inc., Austin, TX (US)

( * ) Notice: Subject to any disclaimer, the term of this patent is extended or adjusted under 35 U.S.C. 154(b) by 246 days.

(21) Appl. No.: 12/209,887

(22) Filed: Sep. 12, 2008

(65) Prior Publication Data

US 2009/0070552 A1 Mar. 12, 2009

Related U.S. Application Data

(63) Continuation of application No. PCT/BE2007/000027, filed on Mar. 19, 2007.

(30) Foreign Application Priority Data

Mar. 17, 2006 (GB) .................................... 0605349.0

(51) Int. Cl.
G06F 15/76 (2006.01)
G06F 9/45 (2006.01)

(52) U.S. Cl. ........................................................ 712/15

(58) Field of Classification Search .......................... None
See application file for complete search history.

(56) References Cited

U.S. PATENT DOCUMENTS

| | | | | |
|---|---|---|---|---|
| 6,684,318 B2 * | 1/2004 | DeHon et al. | ..................... | 712/15 |
| 6,993,639 B2 * | 1/2006 | Schlansker et al. | ............. | 712/18 |
| 7,461,236 B1 * | 12/2008 | Wentzlaff | ........................ | 712/10 |
| 7,490,218 B2 * | 2/2009 | Eggers et al. | .................... | 712/25 |
| 2003/0074542 A1 | 4/2003 | Sasagawa | | |
| 2004/0006584 A1 * | 1/2004 | Vandeweerd | .................. | 709/107 |

FOREIGN PATENT DOCUMENTS

EP 1146420 A1 10/2001
EP 1233340 A2 * 8/2002

OTHER PUBLICATIONS

Invitation to Pay Additional Fees dated Aug. 13, 2007 for Application No. PCT/BE2007/000027.
Written Opinion of Int'l Searching Authority dated Sep. 20, 2007 for PCT/BE2007/000027.
Novo, et al. "Mapping a multiple antenna SDM-OFDM receiver on the ADRES Coarse=Grained Reconfigurable Processor," IEEE 2005.
Pani, et al. "Run-time Adaptive Resources Allocation and Balancing on Nanoprocessors Arrays," IEEE Computer Society, Proceeedins of the 2005 $8^{th}$ Euromicro conference on Digital System Design, 2005, XP-002442404.

(Continued)

*Primary Examiner* — Eric Coleman

(74) *Attorney, Agent, or Firm* — Knobbe Martens Olson & Bear LLP

(57) ABSTRACT

A signal processing device is adapted for simultaneous processing of at least two process threads in a multi-processing manner. The device comprises a plurality of functional units capable of executing word- or subword-level operations on data. The device further comprises means for interconnecting the plurality of functional units, the means for interconnecting supporting a plurality of dynamically switchable interconnect arrangements, and at least one of the interconnect arrangements interconnects the plurality of functional units into at least two non-overlapping processing units each with a pre-determined topology. The device further comprises at least two control modules each assigned to one of the processing units.

34 Claims, 7 Drawing Sheets

OTHER PUBLICATIONS

Wallner, Sebastian. "A Configurable System-on-Chip Architecture for Embedded Devices," ACSAC 2004, LNCS 3189, p. 58-71, Spring-Verlag Berlin Heidelberg, 2004.

Sankaralingam, et al. "Exploiting ILP, TLP, and DLP with the Polymorphous TRIPS Architecture," IEEE Computer Society, Proceedings of the 30th Annual International Symposium on Computer Architecture, 2003.

E. Iwata et al. "Exploiting Coarse-Grain Parallelism in the MPEG-2 Algorithm", Stanford University Computer Systems Lab Technical Report CSL-TR-98-771, Sep. 1998.

G.M. Amdahl, "Validity of the single processor approach to achieve large-scale computing capabilities", Proc. AFIPS Spring Joint Computer Conf. 30, 1967 pp. 483-485.

* cited by examiner

RECONFIGURABLE MULTI-PROCESSING COARSE-GRAIN ARRAY

CROSS REFERENCE TO RELATED APPLICATIONS

This application is a continuation of PCT Application No. PCT/BE2007/000027, filed Mar. 19, 2007, which is incorporated by reference hereby in its entirety.

BACKGROUND OF THE INVENTION

1. Field of the Invention

The present invention relates to signal processing devices adapted for simultaneously processing at least two threads in a multi-processing or multi-threading manner, to methods for executing an application on such a signal processing device, to methods for compilation of application source code in order to obtain compiled code being executable on such a signal processing device, to methods for adjusting applications to be executed on such a signal processing device, to a computer program product for executing any of the methods for executing an application on such a signal processing device, to machine readable data storage devices storing such computer program product and to transmission of such computer program products over local or wide area telecommunications networks.

2. Description of the Related Technology

Nowadays, a typical embedded system requires high performance to perform tasks such as video encoding/decoding at run-time. It should consume little energy so as to be able to work hours or even days using a lightweight battery. It should be flexible enough to integrate multiple applications and standards in one single device. It has to be designed and verified in a short time to market despite substantially increased complexity. The designers are struggling to meet these challenges, which call for innovations of both architectures and design methodology.

Coarse-grained reconfigurable architectures (CGRAs) are emerging as potential candidates to meet the above challenges. Many designs have been pro posed in recent years. These architectures often comprise tens to hundreds of functional units (FUs), which are capable of executing word-level operations instead of hit-level ones found in common field programmable gate arrays (FPGAs). This coarse granularity greatly reduces the delay, area, power and configuration time compared with FPGAs. On the other hand, compared with traditional "coarse-grained" programmable processors, their massive computational resources enable them to achieve high parallelism and efficiency. However, existing CGRAs have not yet been widely adopted mainly because of programming difficulty for such a complex architecture.

SUMMARY OF CERTAIN INVENTIVE ASPECTS

In a first aspect, a signal processing device adapted for simultaneous processing of at least two process threads in a multi-processing manner is disclosed. The signal processing device comprises a plurality of functional units capable of executing word- or subword-level operations on data, and routing resources for interconnecting the plurality of functional units, the routing resources supporting a plurality of interconnect arrangements that can be dynamically switched, at least one of the interconnect arrangements interconnecting the plurality of functional units into at least two non-overlapping processing units each with a pre-determined topology, each of the processing units being configured to process a respective one of the process threads. Another of the interconnect arrangements can interconnect the plurality of functional units into a single processing unit. The signal processing device furthermore comprises at least two control modules, each control module being assigned to one of the processing units for control thereof. With word- or subword-level operations is meant non-bit level operations.

It is an aspect of the invention that the functional units can be grouped in predetermined/static groupings including at least one functional unit, each of the groupings defining a processing unit.

The control modules may include instruction fetch units and control units. The control modules are adapted for controlling the word- or sub word-level (non-bit level) operations within their assigned processing unit.

In another aspect, the control module may perform operations (increment, change) on a program counter. Preferably it also supports some debugging.

In another aspect, a plurality of data storages may be provided, wherein the routing resources interconnect the plurality of functional units and the plurality of data storages. The data storages may be registers. The data storages may be shared between the functional units. One data storage may be provided for each processing unit.

A signal processing device may include a data storage in which an application code is stored, the application code defining a process comprising the at least two process threads and being executable by the processing units. The routing resources may then be adapted for dynamically switching between interconnect arrangements at pre-determined points in the application code.

In a signal processing device, the routing resources may be adapted for dynamically switching interconnect arrangements depending on data content of a running application. Such data content may for example be a parameter file describing to which processing unit functions of a thread are to be mapped, or data, e.g. one or more bits, in a data storage of one of the functional units. The routing resources may comprise multiplexing and/or demultiplexing circuits. The signal processing device may have a clock, wherein the multiplexing and/or demultiplexing circuits are adapted to be configured with appropriate settings for dynamically switching interconnect arrangements, wherein the settings may change every clock cycle.

A signal processing device may further comprise at least one global storage shared between a plurality of functional units.

A signal processing device may include at least two different types of functional units.

In a signal processing device, at least another of the interconnect arrangements may interconnect the plurality of functional units into a single processing unit under control of a single control module.

In a signal processing device, at least one of the at least two control modules may be part of a global control unit for use in an interconnect arrangement with a single processing unit. In at least one interconnect arrangement with a single processing unit, at least one of the control modules may drive control signals of all the functional units by having at least one other control module to follow it.

A signal processing device may be adapted for re-using, in an interconnect arrangement with a single processing unit, at least part of the control modules assigned to the processing units in an interconnect arrangement with a plurality of non-overlapping processing units in the control module used.

In a second aspect, methods for executing at least one application on a signal processing device as disclosed above are disclosed. An application is typically executed on a signal processing device as a single process thread, meaning under control of a single control module.

It is an aspect of the invention to provide a method for executing at least one application wherein switching between a single thread approach and a multi thread approach is applied, wherein a portion of the application is split in parts, and each part is executed as a separate process thread, on one of the predefined processing units. The method thus comprises dynamically switching the signal processing device into a device with at least two non-overlapping processing units, and splitting a portion of the application in at least two process threads, each process thread being executed simultaneously as a separate process thread on one of the processing units, each processing unit being controlled by a separate control module.

This single or multi-threading switching method of executing an application is supported by the configuration capabilities of the signal processing device, in particular the capability to operate it in unified mode, wherein all functional units of the device operate in one thread of control and in split mode, wherein all functional units within a single processing unit operate in one thread of control, and the processing units themselves simultaneously operate in different threads of control.

Or thus, the signal processing device comprises of a plurality of partitions, each capable of running independently a process thread.

A consequence is that within each processing unit the instruction flow can change, for instance due to a branching in the code, independently of the instruction flow in another processing unit.

The use of a signal processing device with a plurality of functional units enables instruction level parallelism while the organization of these functional units in groupings defining processing units enables thread-level parallelism. Because the groupings can be changed dynamically, more flexibility can be obtained than with a multi-core approach.

The capability is realized by providing the two or more control modules, each of the control modules being capable of executing a single thread of control.

Switching the signal processing device into a device with at least two processing units may be determined by a first instruction in application code determining the application. The first instruction may contain a starting address of the instructions of each of the separate process threads. The starting address may be an indicator of where instructions are to be found. It can be a direct reference to a location or a pointer to a location, the location for example being in a register or in a data storage.

A method may further comprise dynamically switching back the signal processing device into a device with a single processing unit, synchronizing the separate control modules and joining the at least two threads of the application into a single process thread, the single process thread being executed as a process thread on the single processing unit under control of the synchronized control modules. Switching back the signal processing device into a device with a single processing unit may be determined by a second instruction in the application code determining the application. The second instruction may contain a starting address of the instructions to be executed as the single process thread.

The single control module may re-use at least one of the separate control modules when executing the application as a single process thread.

In an interconnect arrangement with a single processing unit, one of the separate control modules may drive control signals of all the functional units by having the other control modules to follow it.

It is clear that this single or multi-threading switching method is easily extendable toward a method wherein switching between a first organization of partitions, wherein some of the partitions are executed together as a single thread and others as another thread and a second different organization of partitions.

This generalized switching method may be rephrased as a dynamically, run-time reconfiguring of the device, supported by a static, predetermined organization of the device.

A method is furthermore provided for dynamically reconfiguring a signal processing device in a process for executing at least one application on the signal processing device, the signal processing device comprising a plurality of functional units, capable of executing word- or sub-word level (non-bit level) operations on data, the functional units being grouped into one or more non-overlapping processing units, and routing resources for interconnecting the functional units, the application being arranged as a plurality of threads of which at least a part thereof are at least partly simultaneously executable, the method comprising:

configuring the computing signal processing device by providing a first assignment of one or more threads to the processing units;

after the configuring, simultaneously executing the one or more threads, wherein each of the executed threads being executed on one or more of the processing units in accordance with the first assignment;

ending the execution;

configuring the signal processing device by providing a second, different, assignment of one or more threads to the processing units;

after the configuring, simultaneously executing the one or more threads, each of the executed threads being executed on one or more of the processing units in accordance with the second assignment.

To avoid much overhead, the control modules being used for single thread processing may be re-using at least a part (or even complete) the control modules, available for each processing unit.

In an embodiment thereof, this re-use may be realized by synchronizing the control modules of the partitions, meaning using the same inputs by each of the elements and distributing their respective outputs to their assigned partition.

It is to be noted that the functional units may be flexibly connected, for instance by providing multiplexing and/or de-multiplexing circuits in between them. The dynamical reconfiguring may be realized by providing the appropriate settings to the multiplexing and/or de-multiplexing circuits. The settings can change from cycle-to-cycle.

Another inventive aspect relates to a method for compilation of application source code in order to obtain compiled code being executable on a signal processing device as described, in particular to instruction(s) to be included at source code level to partition the code and also to instruction(s) to be included automatically into the compiled code, for switching being execution modes (e.g. unified and split mode).

In this aspect, a method for compilation of application source code in order to obtain compiled code being executable on a signal processing device as described is disclosed. The method comprises inputting application source code and generating compiled code from the application source code. Generating the compiled code comprises including, in the compiled code, a first instruction for configuring the signal processing device for simultaneous execution of multiple process threads and for starting the simultaneous execution of the process threads, and including a second instruction to end the simultaneous execution of the multiple process threads such that when the last of the multiple process threads decodes this instruction, the signal processing device is configured to continue execution in unified mode. Hence the configuring may be done by the code itself (dynamically).

According to a further aspect of the present invention an architectural description of the signal processing device is provided, including a description of the grouping of the functional units. Indeed such signal processing device is typically generated as an instance of a generic template. The generic template may include the possibility to group functional units so as to form one or more processing units, and to provide control modules per group.

The method may further comprise providing an architectural description of the signal processing device, the architectural description including descriptions of pre-determined interconnect arrangements of functional units forming processing units. Providing the architectural description may include providing a separate control module per processing unit.

Still a further aspect of the invention is to provide a compilation method, comprising inputting application source code and the above-described architectural description, and generating compiled code, including a first instruction (e.g. denoted fork), configuring the signal processing device for execution of multiple threads and starting the execution of the threads, and a second instruction (e.g. denoted join) to end the execution of the multiple threads. In particular the second instruction is such that when the last of the threads decode this instruction, the signal processing device is configured to continue in unified mode.

The first instruction may contain the start address of instructions of each of the multiple process threads. The second instruction may contain the start address of instructions to be executed in unified mode after the execution of the multiple process threads.

Generating the compiled code may comprise partitioning the application source code, thus generating code partitions, labeling in which mode and on which processing unit the code partitions are to be executed, separately compiling each of the code partitions, and linking the compiled code partitions into a single executable code file.

Yet another aspect of the present invention is to provide a compilation method, comprising a step of inputting application source code, and the above-described architectural description, a step of partitioning the code and labeling how (unified/split mode) and where (which processing element) the code will be executed, separate compilation of each of the code partitions and linking the compiled code into a single executable.

Another inventive aspect relates to adjustment environments wherein, for applications, exploration of various partitioning is performed, the adjustment environment also being capable of changing the instance of an architectural description of the signal processing device for exploring various configurations of the signal processing device.

In another aspect, a method of executing an application on a coarse grain reconfigurable signal processing device is disclosed. The method comprises executing an application on a coarse grain reconfigurable signal processing device as a single process thread under control of a primary control module. The method further comprises dynamically switching the coarse grain reconfigurable signal processing device into a device with at least two non-overlapping processing units. The method further comprises splitting a portion of the application in at least two process threads, each process thread being executed simultaneously as a separate process thread on one of the processing units, each processing unit being controlled by a separate control module.

In another aspect, a method of compiling an application source code to obtain compiled code being executable on a coarse grain reconfigurable signal processing device is disclosed. The method comprises inputting an application source code and generating compiled code from the application source code. The generating of the compiled code comprises including, in the compiled code, a first instruction for configuring a coarse grain reconfigurable signal processing device for simultaneous execution of multiple process threads and for starting the simultaneous execution of the process threads. The generating of the compiled code further comprises including a second instruction to end the simultaneous execution of the multiple process threads such that when the last of the multiple process threads decodes this instruction, the coarse grain reconfigurable signal processing device is configured to continue execution in unified mode.

In another aspect, a method of adjusting an application to be executed on a coarse grain reconfigurable signal processing device is disclosed. The method comprises performing exploration of various partitionings of the application. The performing of the exploration comprises changing an instance of an architectural description of a coarse grain reconfigurable signal processing device for exploring various interconnect arrangements of the coarse grain reconfigurable signal processing device by loading one of a plurality of configurations stored in the coarse grain reconfigurable signal processing device.

In another aspect, a coarse grain reconfigurable signal processing device adapted for simultaneous processing of at least two process threads in a multiprocessing manner is disclosed. The device comprises means for executing word- or subword-level operations on data. The device further comprises means for interconnecting the executing means, the interconnecting means supporting a plurality of dynamically switchable interconnect arrangements, at least one of the interconnect arrangements interconnecting the executing means into at least two non-overlapping processing units each with a pre-determined topology, each of the processing units being configured to process a respective one of the process threads. The device further comprises means for controlling the behavior of the coarse grain reconfigurable signal processing device by selecting operations and by controlling the interconnecting means. The device further comprises means for controlling the at least two non-overlapping processing units.

Specific embodiments of the invention are set out in the accompanying claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example only, the principles of the invention. This description is given for the sake of example only, without limiting the scope of the invention. The reference figures quoted below refer to the attached drawings.

DETAILED DESCRIPTION OF CERTAIN ILLUSTRATIVE EMBODIMENTS

Figure 1:
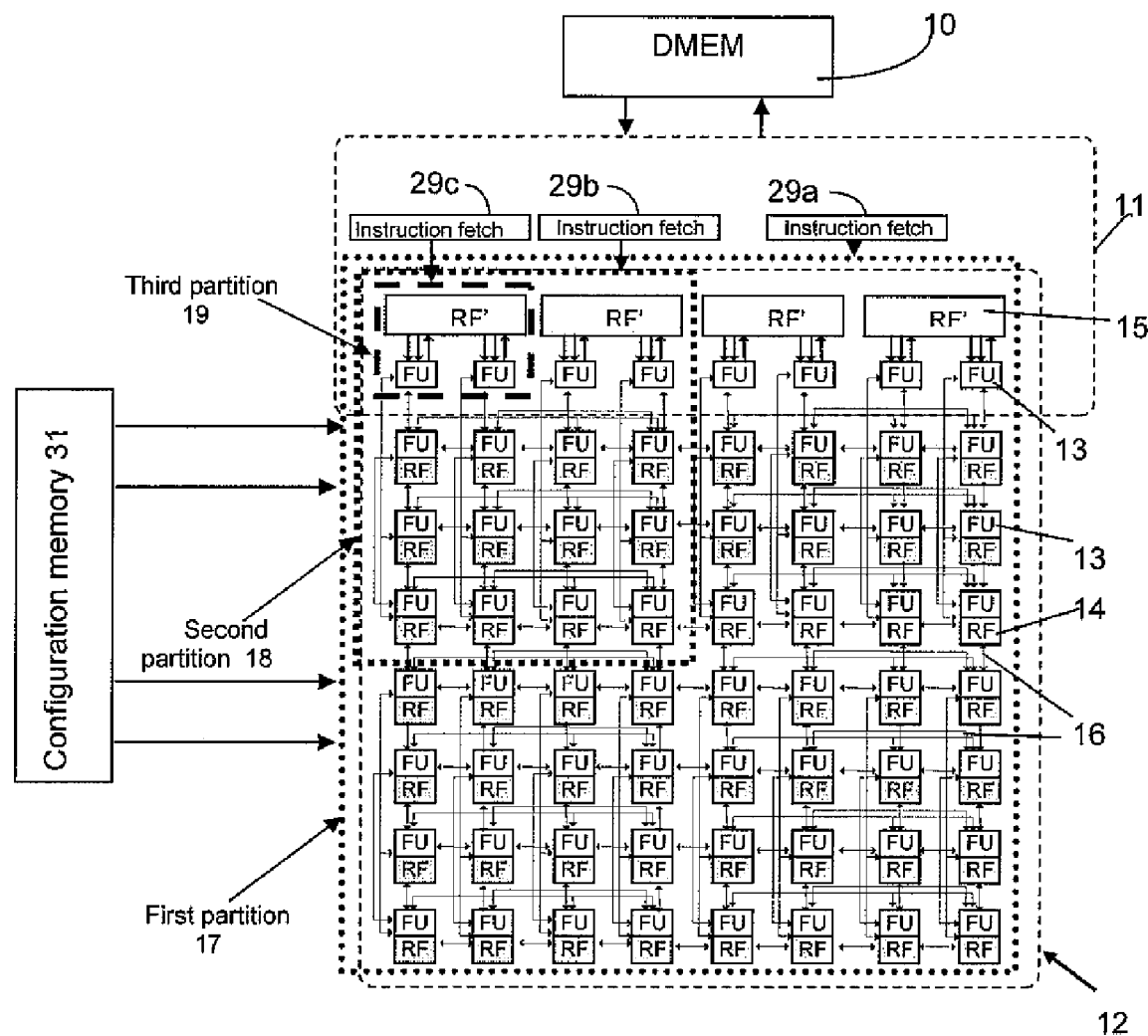
FIG. 1 illustrates an example of an embodiment of a coarse grain array for use with embodiments of the present invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Certain embodiments as described below relate to a particular coarse-grained reconfigurable architecture (CGRA) that addresses issues of existing CGRAs. One or more of these embodiments will be described with reference to ADRES (architecture for dynamically reconfigurable embedded systems), known and manufactured by Interuniversitair Microelektronicacentrum vzw, Leuven, Belgium, for illustration purpose only. However, the reference to the ADRES throughout this document is not intended to limit the embodiments to the ADRES structure only. The inventive aspects covered in the description may also be used for other suitable coarse grain array architectures.

The ADRES architecture is a datapath-coupled coarse-grained reconfigurable matrix. The ADRES architecture is a power-efficient flexible architecture template that combines a very long instruction word (VLIW) digital signal processor (DSP) with a 2-D coarse-grained heterogeneous reconfigurable array (CGA), which is extended from the VLIW's datapath. VLIW architectures execute multiple instructions per cycle, packed into a single large "instruction word" or "packet", and use simple, regular instruction sets. The VLIW DSP efficiently executes control-flow code by exploiting instruction-level parallelism (ILP). The array, containing many functional units, accelerates data-flow loops by exploiting high degrees of loop-level parallelism (LLP). The architecture template allows designers to specify the interconnection, the type and the number of functional units.

The ADRES template thus tightly couples a very-long instruction word (VLIW) processor 11 and a coarse-grained array 12 by providing two functional modes on the same physical resources. It brings advantages such as high performance, low communication overhead and easiness of programming. An application written in a programming language such as e.g. C can be quickly mapped onto an ADRES instance. ADRES is a template instead of a concrete architecture. Architectural exploration becomes possible to discover better architectures or design domain-specific architectures.

The ADRES array is a flexible template instead of a concrete instance. An architecture description language is developed to specify different ADRES instances. A script-based technique allows a designer to easily generate different instances by specifying different values for the communication topology, supported operation set, resource allocation and timing of the target architecture. Together with a retargetable simulator and compiler, this tool-chain allows for architecture exploration and development of application domain specific processors. As ADRES instances are defined using a template, the VLIW width, the array size, the interconnect topology, etc. can vary depending on the use case.

The ADRES template includes many basic components, including computational, storage and routing resources. The computational resources are functional units (FUs) 13 that are capable of executing a set of word-level operations selected by a control signal. Data storages such as register files (RFs) 14 and memory blocks 15 can be used to store intermediate data. The routing resources 16 include wires, multiplexers and busses. An ADRES instance thus comprises functional units 13, registers 15 and register files 14, and routing resources 16 such as busses and multiplexers to connect the functional units 14 and the register files 14.

Basically, computational resources (FUs) 13 and storage resources (e.g. RFs) are connected in a certain topology by the routing resources 16 to form an instance of an ADRES array. The whole ADRES array has two functional modes: the VLIW processor 11 and the reconfigurable array 12, as indicated by the dashed lines in FIG. 1. These two functional modes 11, 12 can share physical resources because their executions will never overlap thanks to a processor/co-processor model. The processor operates either in VLIW mode or in CGA mode. The global data register files RF' 15 are used in both modes and serve as a data interface between both modes, enabling an integrated compilation flow.

The VLIW processor 11 includes several FUs 13 and at least one multi-port register file RF' 15, as in typical VLIW architectures, but in this case the VLIW processor 11 is also used as the first row of the reconfigurable array 12. Some FUs 13 of this first row are connected to the memory hierarchy 10, depending on the number of available ports. Data accesses to the memory of the unified architecture are done through load/store operations available on these FUs.

When compiling, with a compiler, applications for an ADRES architecture, loops are modulo-scheduled for the CGA 12 and the remaining code is compiled for the VLIW 11. By seamlessly switching the architecture between the VLIW mode and the CGA mode at run-time, statically partitioned and scheduled applications can be run on the ADRES instance with a high number of instructions-per-clock (IPC).

Figure 3:
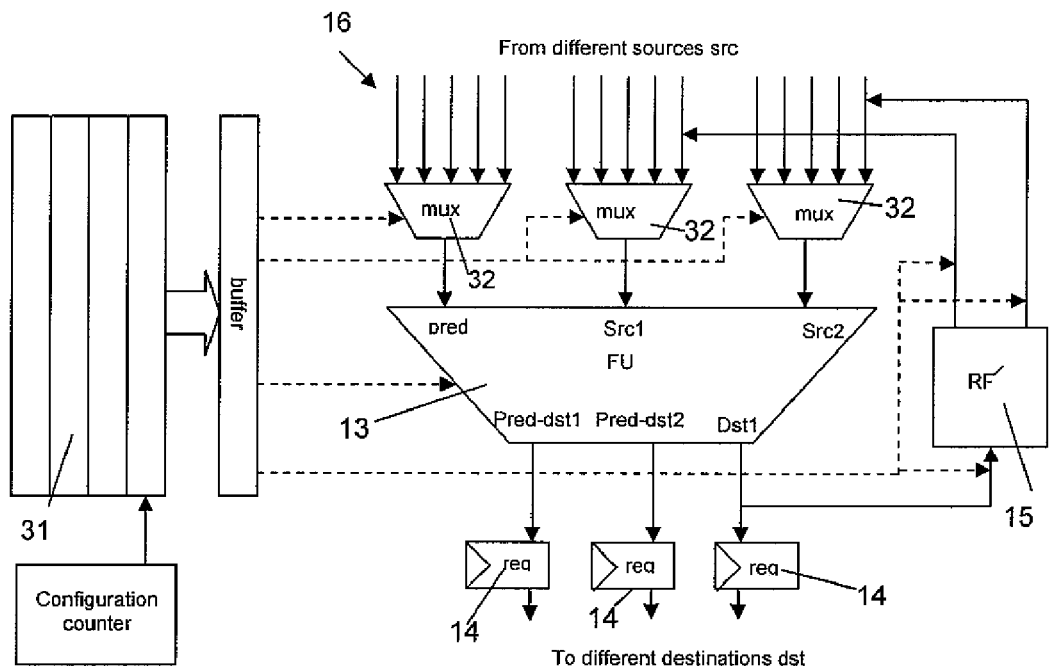
FIG. 3 illustrates a detailed datapath of a functional unit in accordance with embodiments of the present invention.

To remove the control flow inside loops, the FUs 13 support predicated operations. The results of the FUs 13 can be written to data storages such as the distributed RFs 14, i.e. RFs 14 dedicated to a particular functional unit 13, which RFs 14 are small and have fewer ports than the shared data storage such as register files RF' 15, which is at least one global data storage shared between a plurality of functional units 13, or the results of the FUs 13 can be routed to other FUs 13. To guarantee timing, the outputs of FUs 13 may be buffered by an output register. Multiplexers 32 are part of the routing resources 16 for interconnecting FUs 13 into at least two non-overlapping processing units. They are used to route data from different sources. The configuration RAM 31 (see FIG. 1 and FIG. 3) stores a few configurations locally, which can be loaded on a cycle-by-cycle basis. The configurations can also be loaded from the memory hierarchy 10 at the cost of extra delay if the local configuration RAM 31 is not big enough. Like instructions in microprocessors, the configurations control the behavior of the basic components by selecting operations and controlling multiplexers. An example of a detailed datapath as described above is illustrated in FIG. 3

An embodiment of the invention extends a highly parallel data processing architecture, e.g. the ADRES, or a coarse-grain reconfigurable array, to a multi-threading/processing device. As set out above, an ADRES instance comprises functional units 13, data storages such as registers and register files 14, and connecting resources 16 such as busses and multiplexers to connect the functional units 13 and the register files 14. ADRES supports an MIMD (Multiple Instruction Multiple Data) programming model by, every cycle if needed, independently configuring every element of the array. In addition, functional units 13 may support SIMD (Single Instruction Multiple Data) processing to utilize the width of the data path. A special programming approach is used to extract very high instruction level parallelism (ILP) from suitable portions of the code. ADRES also implements a traditional VLIW (Very Long Instruction Word) mode in which less functional units are executing. This may be used for code where less instruction-level parallelism (ILP) is obtainable, and where a traditional programming model is sufficient.

For the embodiment of the invention the ADRES array is being sub-divided into partitions, to enable thread-level parallelism. Every partition or combination of partitions can execute in VLIW mode and in array mode. This multi-threading could also be achieved by instantiating multiple ADRES instances, but the novel partitioning approach allows to also run a thread on two or more joined partitions. This is essentially providing another dimension of reconfigurability.

The topology, the connectivity, and the features of the functional units 13 and register files 14 of an ADRES instance are defined at design time with an architecture template. For the multi-threaded ADRES the template is extended to include information about the partitioning and also to guarantee that each partition or combination of partitions is itself a valid ADRES instance. The architecture template defines all aspects of a specific ADRES instance for the compiler.

FIG. 1 shows an example for a possible ADRES template with three partitions 17, 18, 19. Thereby, for example one, two or three threads may be executed in parallel, using various combinations of partitions to execute a thread. For example, a single thread could execute on the whole 8×8 array (indicated as first partition 17), or on the 1×2 sub-partition (indicated as third partition 19), or on the 4×4 sub-partition (indicated as second partition 18), with the rest (non-used part) of the array in a low-power mode. In the following, the partitions of this example are indicated first partition 17, second partition 18 and third partition 19 respectively. The partitions 17, 18, 19 have been chosen to be of different size, to better adapt the architecture to the degree of parallelism available in a thread. This can be combined with using heterogeneous functional units, and even with heterogeneous data path widths, to optimize a partition for some specific functionality.

The embodiment of the invention leverages and extends the programming model of ADRES. The compiler generates code for the VLIW mode and for the array mode e.g. based on the data in a parameter file and based on some constructs in the code, like a function name prefix and intrinsics, that is, special instructions. Similarly, the split mode operation, i.e. the mode of operation when a plurality of threads are run in parallel on a plurality of non-overlapping processing units, each processing unit being under the control of a control module assigned to the processing unit, may be indicated e.g. by settings in a parameter file and by using special instructions for splitting and joining partitions. The entries in the parameter file describe to which partition the first and subsequent functions of a thread shall be mapped, so that the compiler knows which architecture template to use.

An enhanced compiler may automatically identify parallel threads in the code and explore the available partitions for a mapping which is improved, or even optimized, for performance and power consumption.

Alternatively, it may be the task of a programmer to define threads in the code by inserting instructions for splitting the array, or a partition, into sub-partitions. The arguments of the instruction will at least contain a reference, e.g. pointers, to the first function in each parallel thread. The mechanism of the split instruction thus is to change the state of the array or partition, and to trigger the threads through something that resembles a subroutine call. Besides saving the return address, the instruction also sets up the partitions' registers 15 for split operation, that is, it is initializing the stack pointers for all new threads. The data register file of the array should be implemented as a clustered register file so that clusters are not shared between any potential partitions of the array.

Figure 2:
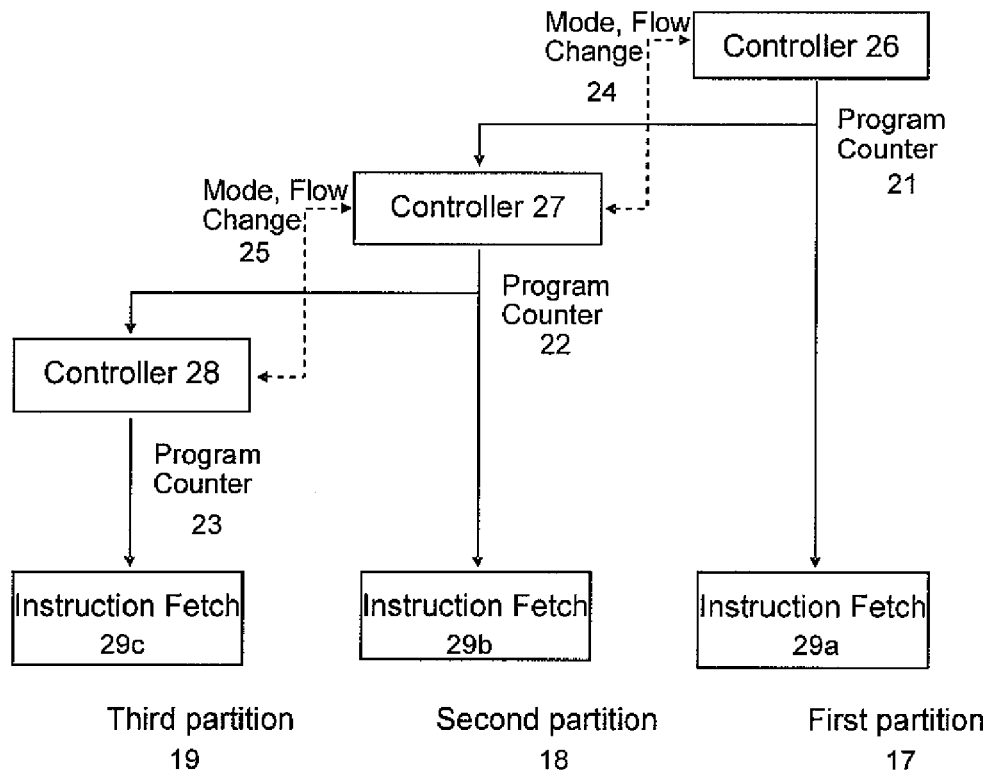
FIG. 2 illustrates a concept for the reusability and scalability of control modules and instruction fetch units in accordance with embodiments of the present invention.

Every partition 17, 18, 19 has its own set of control signals: program counters 21, 22, 23 for VLIW and array mode, and mode and other status flags 24, 25. Also, every partition 17, 18, 19 has its own control module 26, 27, 28 to drive these signals. When running in unified mode, i.e. in an interconnect arrangement with a single processing unit, one control module 26 drives the control signals of all partitions within that interconnect arrangement by having the other control modules 27, 28 follow it, as shown in FIG. 2. The control modules 26, 27, 28 may be multiple instantiations of the same module. For synchronized execution the program counter 21, 22, 23 may be pushed from one control module to the next. Other implementations for synchronizing the control modules 26, 27, 28 are possible. An aspect is that control modules can be reused from existing implementations and only need very few enhancements. When the split is executed, the individual control modules 26, 27, 28 start executing the first instruction in each thread, as provided by the function pointers in the split instruction. Each control module 26, 27, 28 in the split mode drives its respective signals. From a programmer's viewpoint, the partitions now operate like individual ADRES instances and can independently switch between VLIW mode and CGA mode.

However, the programmer may work with a data memory that is shared between all threads. Again, an enhanced compiler can support the programmer, in this case with the task of memory allocation for multiple threads. For synchronization of and sharing data between threads the enhanced architecture provides special instructions for efficiently implementing semaphores and other multi-processing primitives.

A shared architectural element is the instruction memory. This is not directly affecting the programming model, it only requires that, when linking the code partitions, the linker or linking module is aware of the partitions for packing the code of parallel threads. Every partition has an independent instruction fetch unit 29a, 29b, 29c, connected directly to its respective control module 26, 27, 28. When in unified mode, the control modules 26, 27, 28 are synchronized via the program counter 21, 22, 23. In this case, the instruction units 29a, 29b, 29c fetch portions of the set of instructions for the unified partition, and therefore the execution follows the same flow. When in split mode, each controller 26, 27, 28 follows its own thread's flow of execution, and each instruction unit 29a, 29b, 29c fetches the set of instructions for the respective sub-partition. The linkage between control modules 26, 27, 28 and instruction fetch units 29a, 29b, 29c is shown in FIG. 2.

To join threads, special join instructions are inserted in the code which will end the current thread. The respective partition can automatically be put into low-power mode. When the last thread initiated from a split instruction ends, the execution will continue on the now combined partitions, with the next instruction following the split. For recovery routines special mechanisms are provided to permit a thread to monitor and, when necessary, abort another thread.

The embodiment of the invention extends an already highly parallel, reconfigurable architecture with another dimension of parallelism and reconfigurability. It leverages the existing architecture and tools, especially the compiler, while retaining a simple programming model. The multi-threading extension allows users of the coarse-grain array to exploit function-level parallelism, as well as complex data-level parallelism, which allows efficiently implementing the variability in applied algorithms found in emerging applications. The programmability and simplicity of the embodiment is the key differentiating factor.

As an example, an MPEG2 decoder is used for a demonstration of a multithreaded architecture in accordance with embodiments of the present invention. Most MPEG2 decoder kernels can be scheduled on a CGA with the number of instructions per clock (IPC) ranging from 8 to 43. It has been observed, however, that some modulo-scheduled kernels' IPC do not scale very well when the size of the CGA increases. Some of the most aggressive architectures have the potential to execute 64 instructions per clock cycle, but few applications can utilize this level of parallelism, resulting in a much lower average IPC. This is caused by two reasons: (1) The inherent ILP of the kernels is low and cannot be increased efficiently even with loop unrolling, or the code is too complex to be scheduled efficiently on so many units due to resource constraints, for example the number of memory ports. (2) The CGA is idle when executing sequential code in VLIW mode. The more sequential code is executed, the lower the achieved application's average IPC, and in turn, the lower the CGA utilization. In conclusion, even though the ADRES architecture is highly scalable, the challenge is faced of getting more parallelism out of many applications, which fits better to be executed on smaller ADRES arrays. This is commonly known as Amdahl's law, as described by G. M. Amdahl in "Validity of the single processor approach to achieve large-scale computing capabilities", Proc. AFIPS Spring Joint Computer Conf, 30, 1967 Page(s): 483-485.

If properly reorganized and transformed at programming time, multiple kernels in a same application can be efficiently parallelized by an application designer. Low-LLP kernels can be statically identified through profiling, the optimal choice of ADRES array size for each kernel can be estimated, and a large ADRES array can be partitioned into several small-scaled ADRES sub-arrays that fit each kernel, which is parallelized into threads if possible. When an application is executed, a large ADRES array can be split into several smaller sub-arrays for executing several low-LLP kernels in parallel. Similarly, when a high-LLP kernel is executed, sub-arrays can be unified into a large ADRES array. Such a multi-threaded ADRES (MT-ADRES) is highly flexible, and can increase the over utilization of large-scaled ADRES arrays when the LLP of application is hard to explore.

Hereinafter, a demonstrative dual-threading experiment is presented on an MPEG2 decoder implemented on top of a single-threaded architecture, as well as its matching compilation tools. Through this experiment, it has been proven that multithreading is feasible for the ADRES architecture.

Figure 4:
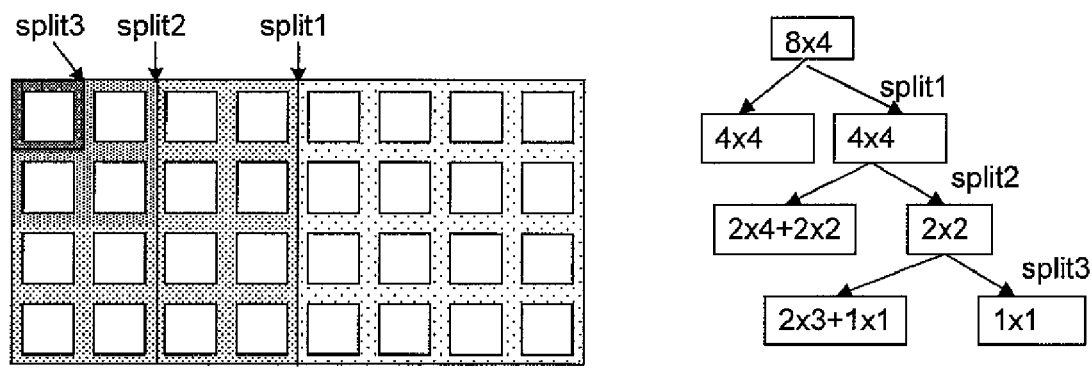
FIG. 4 illustrates scalable partitioning-based threading in accordance with embodiments of the present invention.

A scalable partitioning-based threading approach is proposed for a coarse-grained reconfigurable architecture such as ADRES. The rich resource on the ADRES architecture allows partitioning a large coarse-grained reconfigurable array into two or more sub-arrays, each of which can be viewed as a down-scaled coarse-grained reconfigurable architecture and can be partitioned further down hierarchically, as shown in FIG. 4. With the partitioning technique in accordance with embodiments of the present invention it is possible to dynamically share HW resources between threads without the cost of the control logic of dynamic out-of-order execution, as used in general-purpose processors.

Each thread has its own resource requirement. A thread that has high ILP requires more computation resources, thus executing it on a larger partition results in a more efficient use of the ADRES array and vice versa. A globally optimal application design demands that the programmer knows the IPC of each part of the application, so that he can find an efficient array partition for each thread.

The easiest way to find out how many resources are required by each part of a certain application is to profile the code. A programmer starts from a single-threaded application and profiles it on a large single-threaded reconfigurable coarse-grain array. From the profiling results, kernels with low IPC and which are less dependent to the other kernels are identified as the high-priority candidates for threading. Depending on the resource demand and dependency of the threads, the programmer statically plans on how and when the reconfigurable coarse-grain array should split into partitions during application execution. When the threads are well-organized, the full array can be efficiently utilized.

Architecture Design Aspects

The FU array on the ADRES is heterogeneous, meaning that a plurality of different FUs 13 are present in the array. There exist dedicated memory units, special arithmetic units and control/branch units on the array that constrain the partitioning. When partitioning the array, it has to be guaranteed that the program being executed on certain partitions can be scheduled. This requires that any instruction invoked in a thread is to be supported by at least one of the functional units in the array partition. The well-formed partitions usually have at least one VLIW FU that can perform branch operations, one FU that can perform memory operations, several arithmetic units if needed, and several FUs that can handle general operations.

On the ADRES architecture, the VLIW register file (RF') 15 is a resource that cannot be partitioned easily. The ADRES architecture may employ a clustered register file. If the RF bank is prohibited to be shared among several threads, the RF cluster can be partitioned with the VLIW/CGA, and the thread compilation can be greatly simplified. In case a single register file is used, the register allocation scheme must be revised to support the constrained register allocation.

The ADRES architecture may have ultra-wide memory bandwidth. Multi-bank memory adapted to the architecture to reduce bank conflicts has proven to cope nicely with a static data-allocation scheme. On ADRES, the memory and the algorithm core may be interfaced with a crossbar with queues. Such a memory interface offers a scratchpad style of memory presentation to all the load/store units, thus the multi-bank memory can be used as a shared synchronization memory.

Besides the shared memory, other dedicated synchronization primitives like register-based semaphores or pipes can also be adapted to the ADRES template. These primitives can be connected between pairs of functional units that belong to different thread partitions. Synchronization instruction can be added to certain functional units as intrinsics.

In the single-threading ADRES architecture, the program counter and the dynamic reconfiguration counter may be controlled by a finite-state-machine (FSM) type control unit. When implementing the multithreading ADRES, an extendable control mechanism may be used to match the hierarchically partitioned array.

Figure 5:
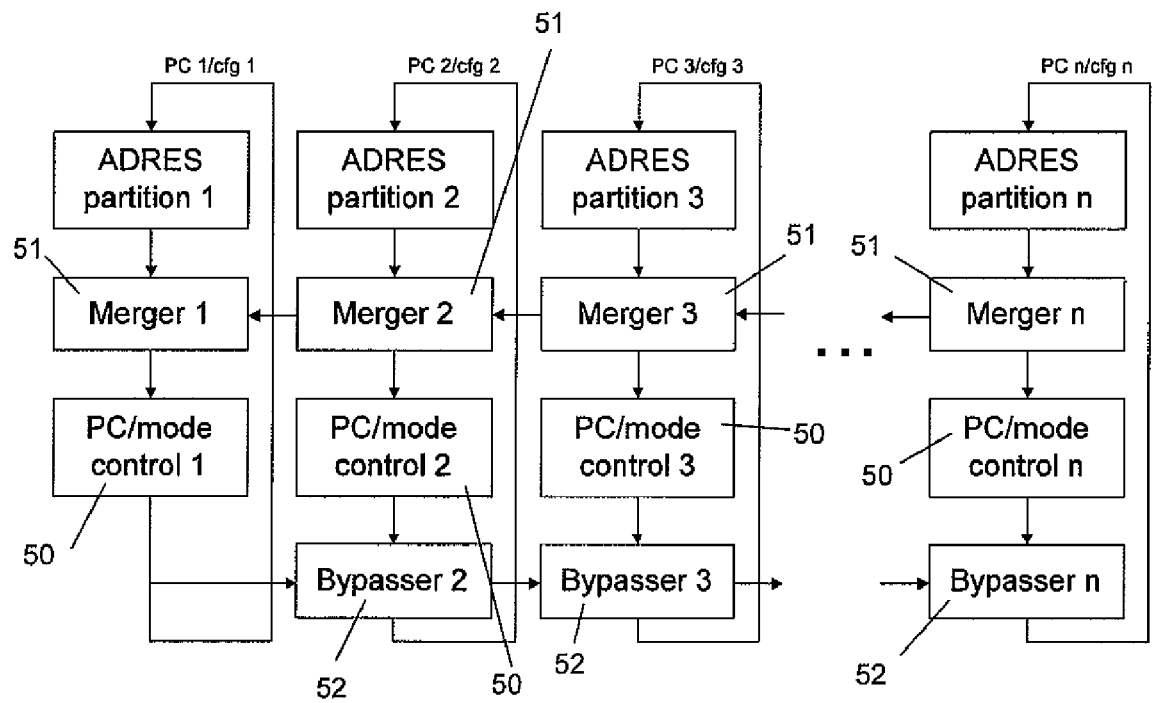
FIG. 5 illustrates a hierarchical multi-threading controller in accordance with embodiments of the present invention.

As shown in FIG. 5, the FSM type controller may be duplicated and the controllers may be organized in a hierarchical manner. In this multi-threading controller, each partition is still controlled by an FSM controller 50, but the control path may be extended with two units called merger 51 and bypasser 52. The merger 51 and bypasser 52 form a hierarchical master-slave control that is easy to manage during program execution. The merger path is used to communicate change-of-flow information to the master controller of a partition, while the bypasser propagates the current PC or configuration memory address from the master to all slaves within a partition.

The principle of having such a control mechanism is as follows. Suppose an ADRES architecture that can be split into two halves for dual threading, while each half has its own controller. In order to reuse the controllers as much as possible, each controller controls a partition of the ADRES when the program is running in dual threaded mode, but it is also preferred that one of the controllers takes full control of the whole ADRES when the program is running in the single-threaded mode. By assigning one of the controllers to control the whole ADRES, a master is created. When the ADRES is running in the single-thread mode, the master controller also receives a signal from the slave partition and merges it with the master partition's signal for creating global control signal.

At the same time, the slave partition should bypass any signal generated from the local controller and follow the global control signal generated from the master partition. When the ADRES is running in the dual-threaded mode, the master and slave controllers completely ignore the control signals coming from the other partition and only respond to the local signals. This strategy can be easily extended to cope with further partitioning.

Multithreading Methodology

Figure 6:
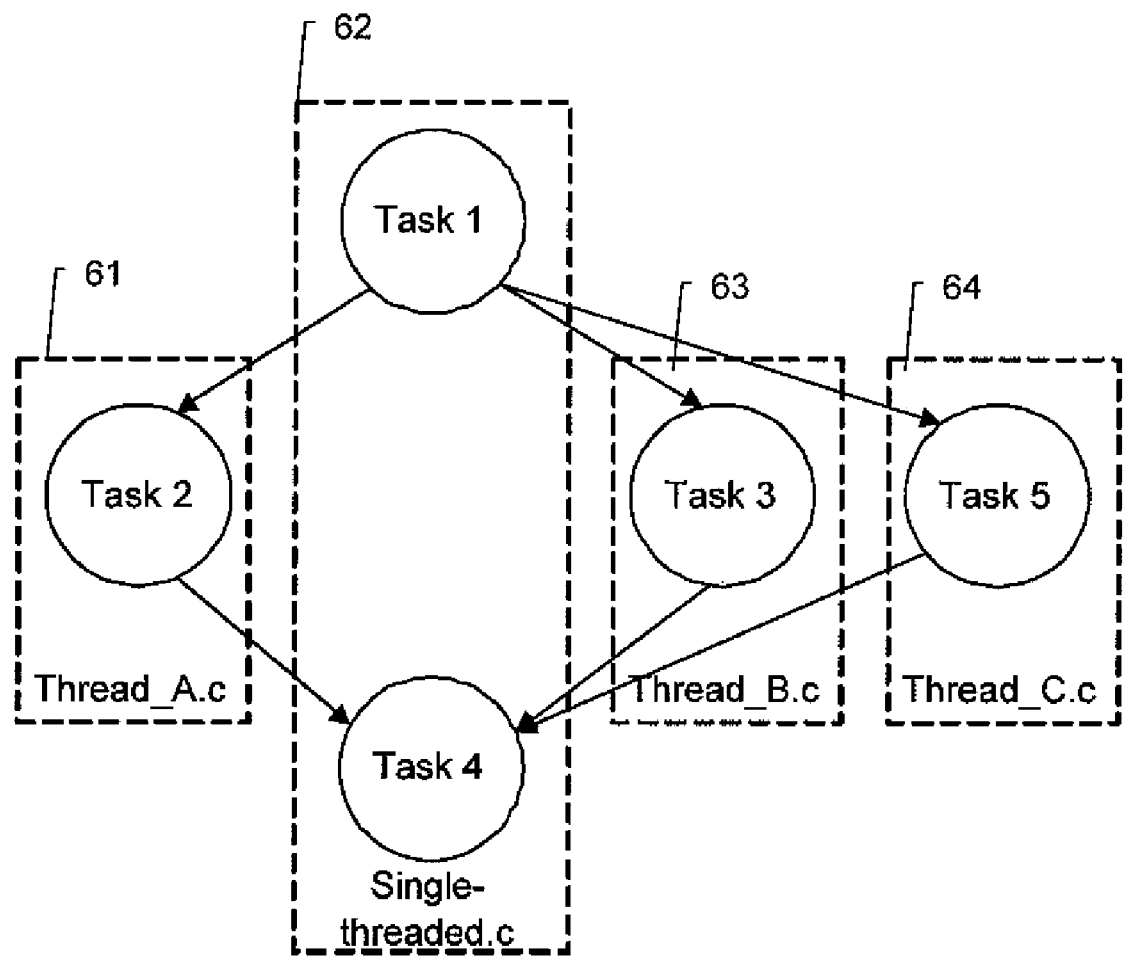
FIG. 6 illustrates source code reorganization in accordance with embodiments of the present invention.

Before a threaded application can be compiled, the application should be reorganized. As shown in FIG. 6, the application may be split into several thread files 61, 62, 63, 64, each of which describes a thread that is to be executed on a specific partition, e.g. C-files, assuming the application is programmed in C. The data shared among threads are defined in a global file that is included in all the thread-files, and protected with a synchronization mechanism. Such reorganization takes modest effort, but makes it easier for a programmer to experiment on different thread/partition combinations to find an efficient, e.g. optimal resource budget. In the embodiment illustrated in FIG. 6, task 1 is first executed in unified mode. After execution of task 1, the ADRES architecture is split into three parallel processing units for executing task 2, task 3 and task 4 in parallel. After having executed tasks 2, 3 and 5, the ADRES architecture is again brought in unified mode, for executing task 4.

Figure 7:
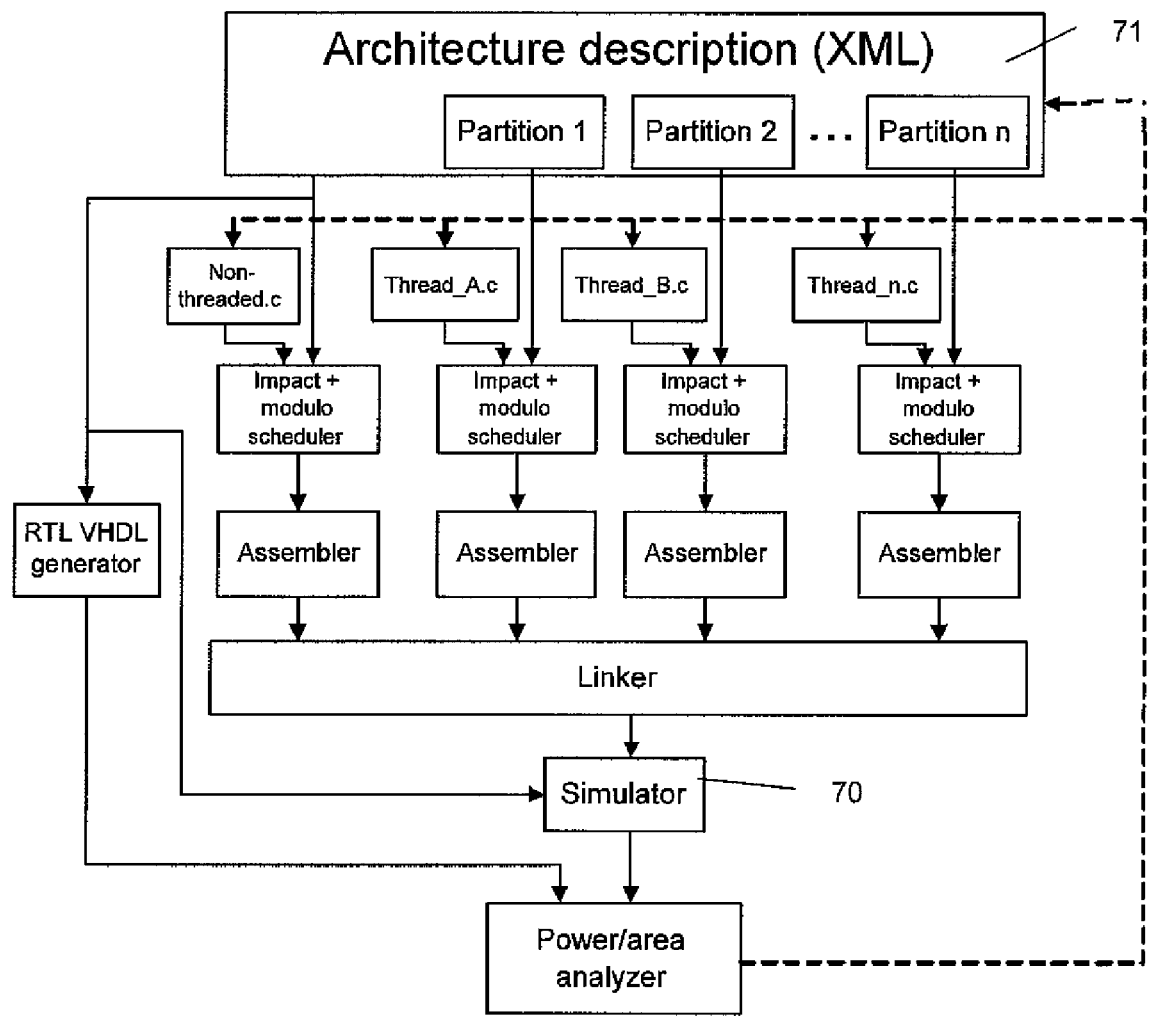
FIG. 7 illustrates a multi-threading compilation tool chain in accordance with embodiments of the present invention.

The multithreading architecture description, e.g. the ADRES architecture description, is extended with the partition descriptions, as shown in FIG. 7. Similar to the area-constrained placement and routing on a commercial FPGA, when a thread is scheduled on an ADRES partition, the instruction placement and routing is constrained by the partition description. The generated assembly code of each thread goes though the assembling process separately, and gets linked in the final compilation step.

The simulator 70 reads the architecture description 71 and generates an architecture simulation model before the application simulation starts. As shown in FIG. 5, each partition has its own controller 50, thus the generation of the controller's simulation model depends on the partition description as well. Furthermore, the control signal distribution is also partition-dependent, thus requires the partition description to be consulted during simulation model generation.

Some other minor practical issues need to be addressed in the multithreading methodology according to embodiments of the present invention. The most costly problem is that different partitions of the ADRES are conceptually different ADRES instances, thus a function compiled for a specific partition cannot be executed on any other partitions. When a function is called by more than one thread, multiple partition-specific binaries of this function have to be stored in the instruction memory for different callers. Secondly, multiple stacks need to be allocated in the data memory.

Each time the ADRES splits into smaller partitions due to the threading, a new stack should be created to store the temporary data. Currently, the best solution to decide where the new stack should be created is based on the profiling, and the thread stacks are allocated at compile time. And finally, each time the new thread is created, a new set of special purpose registers needs to be initialized. Several clock cycles are needed to properly initial the stack points, the return register, etc. immediately after the thread starts running.

Experiment

In order to understand which features are desirable for supporting the multi-threaded methodology according to embodiments of the present invention and to prove its feasibility, an experiment has been carried out based on an MPEG2 decoder, a well-understood benchmark. An objective is to go through the whole process of generating the threaded application executable, partitioning the instruction/data memory for threads, upgrading the cycle-true architecture simulation model and successfully simulating the execution of MPEG2 decoder with a simulator according to embodiments of the present invention. By going through the whole process, ample knowledge can be acquired on how to automate the compilation for threads and simulation/RTL model generation of MT-ADRES.

Figure 8:
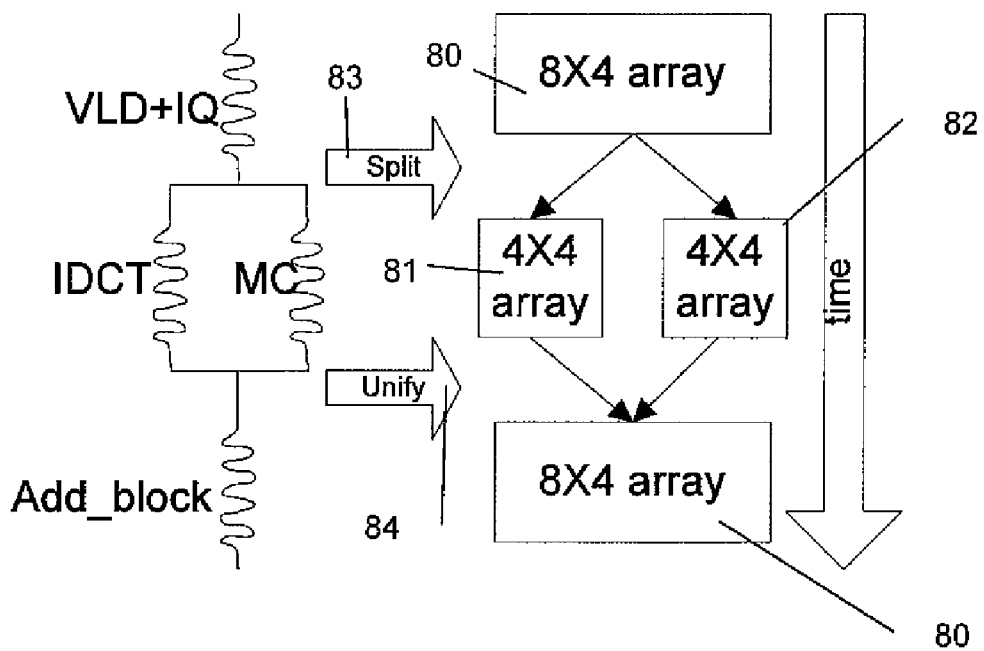
FIG. 8 illustrates, as an example, threading on an MPEG2 decoder.

The proof-of-concept experiment achieves dual-threading on the MPEG2 decoder. The MPEG2 decoder can be parallelized on several granularities, as described by E. Iwata et al. "Exploiting Coarse-Grain Parallelism in the MPEG-2 Algorithm", Stanford University Computer Systems Lab Technical Report CSL-TR-98-771, September 1998, thus it is a suitable application to experiment on. The Inverse Discrete Cosine Transform (IDCT) and Motion Compensation (MC) have been chosen as two parallel threads, and reorganized the MPEG2 decoder as shown in FIG. 8. The decoder starts its execution on an 8×4 array 80, executes the Variable Length Decoding (VLD) and Inverse Quantization (IQ), and switches to the threading mode (split mode). When the thread execution starts, the 8×4 array 80 splits into two 4×4 ADRES arrays 81, 82 and continues on executing the threads. When both threads are finished, the two 4×4 arrays 81, 82 unify and continue on executing the add block function in unified mode on the 8×4 array 80. The MPEG2 program has been reorganized as described in FIG. 8, and added "split" instructions 83 (fork instruction) and "unify" instructions 84 (join instructions) as intrinsics. These instructions 83, 84 currently do nothing by themselves, and are only used to mark where the thread mode should change in the MPEG2's binary code. These marks are used by the split-control unit at run time for enabling/disabling the thread-mode program execution.

Figure 9:
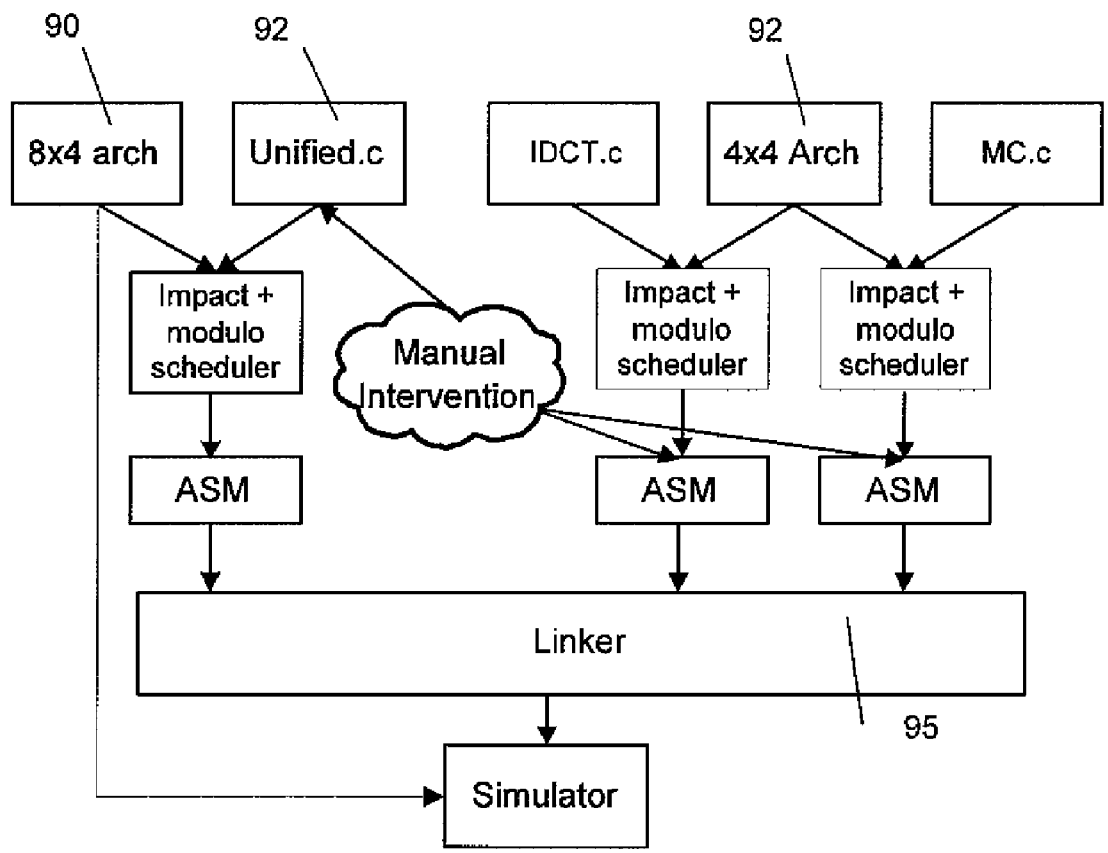
FIG. 9 illustrates an experimental dual-threading compilation flow.

The dual-threading compilation flow in accordance with embodiments of the present invention is shown in FIG. 9. The lack of partition-based scheduling forces us to use two architectures as the input to the scheduling. The 8×4 architecture 90 is carefully designed so that the left and the right halves are exactly the same. This architecture is the execution platform of the whole MPEG2 binary. A 4×4 architecture 91 is also needed, which is a helping architecture that is compatible to either half of the 8×4 array. This architecture is used as a half-array partition description of the 8×4 architecture 90. With these two architectures 90, 91 in place, the single-threaded file 92, e.g. C-file, is compiled, as well as the threads on the 8×4 architecture and the 4×4 architecture, respectively. The later linking by linker 95 stitches the binaries from different parts of the program seamlessly.

Figure 10:
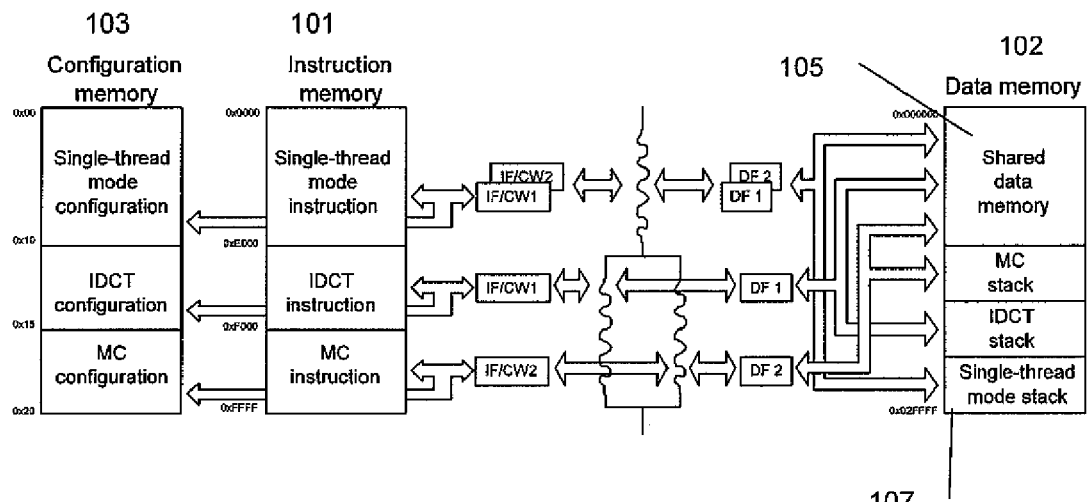
FIG. 10 illustrates dual-threading memory management in accordance with embodiments of the present invention.

The memory partitioning of the threaded MPEG2 is shown in FIG. 10. The instruction fetching (IF), data fetching (DF) and the configuration-word fetching (CW) has been duplicated for dual-threading. The fetching unit pairs are step-locked during single-threaded program execution. When the architecture goes into the dual-threading mode, the fetching unit pairs split up into two sets, each of which is controlled by the controller in a thread partition.

During the linking, the instruction memory 101 and data memory 102 are divided into partitions. Both the instruction memory 101 and configuration memory 103 are divided into three partitions. These three partition pairs store the instructions and configurations of single-threaded binaries, IDCT binaries and MC binaries, as shown on FIG. 10. The data memory 102 is divided into four partitions. The largest data memory partition is the shared global static data memory 105. Both single-threaded and dual-threaded programs store their data into the same memory partition 105. The rest of the data memory 102 is divided into three stacks. The IDCT thread's stack 106 grows directly above the single-threaded program's stack 107, since they use the same physical controller and stack pointer. The base stack address of the MC thread is offset to a free memory location at linking time. When the program execution goes into dual-threading mode, the MC stack pointer is properly initialized at the cost of several clock cycles.

Figure 11:
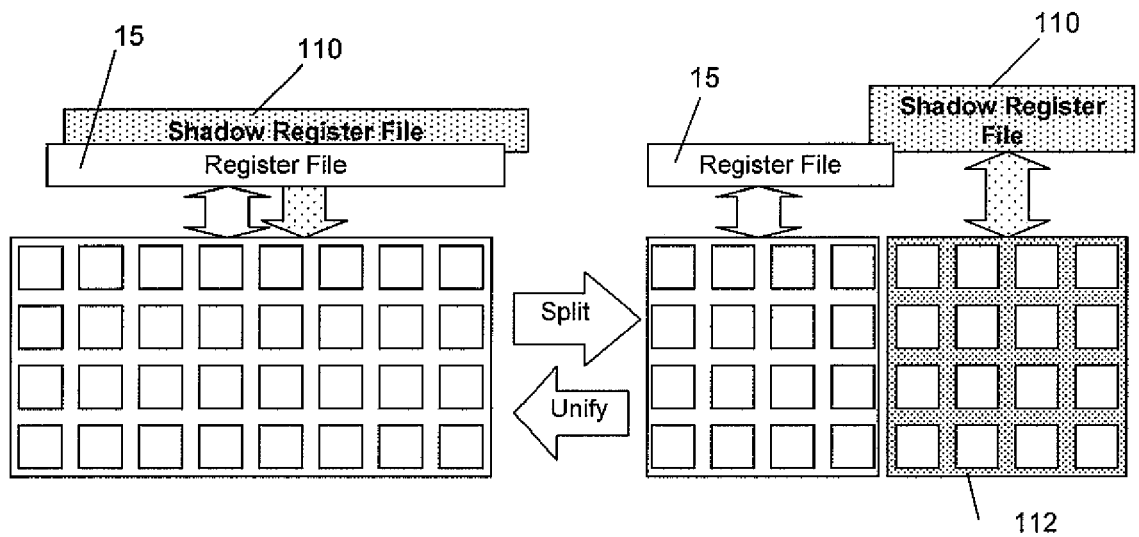
FIG. 11 illustrates a shadow register file set-up according to embodiments of the present invention.

In an alternative embodiment, the clustered register file can be clustered among the array partitions so that each thread has its own register file(s). However, due to the lack of a partitioning-based register allocation algorithm at the current stage, the partitioning approach is not very feasible. We experiment on the ADRES architecture with a single global register file and go for the duplication based approach to temporary accommodate the register file issue. As shown in FIG. 11, a shadow register file 110 may be added into the architecture. When a single-threaded program is being executed, the shadow register file 110 is step-locked with the primary register file 15. When the program initiates the dual-thread execution, the MC thread gets access to the shadow register file 110 and continues the execution on the array partition 112 and shadow register file 15. When the program resumes to the single threaded execution, the shadow register file 110 becomes hidden again. The MPEG2 program is slightly modified so that all the data being shared between threads and all the live-in and live-out variables are passed through the global data memory.

The scalable control concept in FIG. 5 has been verified in the simulation model in accordance with embodiments of the present invention. It has been shown that this scheme can be extended to a certain scale, and the control unit simulation model generation can be automated.

During the program linking, it is identified where the "split" and "unify" instructions are stored in the instruction memory. These instructions' physical addresses mark the beginning and the ending point of the dual-threading mode. During the simulation model generation, these instructions' addresses are stored in a set of special-purpose registers in a split-control unit. After the program starts executing, the program counter's (PC) values are checked by the split-control unit in each clock cycle. When the program counter reaches the split point, he split-control unit sends control signals to the merger and bypasser to enable the threading mode. After the program goes into the threaded mode, the split-controller waits for both threads to join in by reaching the PC value where the "unify" instructions are stored. The first thread that joins in will be halted till the other thread finishes. When the second thread eventually joins in, the split-control switches the ADRES array back to single-threaded mode, and the architecture resumes to the 8×4 array mode. The overhead of performing split and unify operations mainly comes from executing several bookkeeping instructions on some special-purpose registers, and such overhead is negligible.

When an application gets more complicated and has multiple splitting/unifying point, the current approach will become more difficult to manage, thus architectures according to embodiments of the present invention may only rely on the instruction decoding to detect the "split" and "unify" instructions. The split-control unit may be removed, and part of its function may be moved into each partition's local controller.

The simulation result shows that the threaded MPEG2 produces the correct image frame at a slightly faster rate.

Table 1 shows the clock count of the first 5 image frames decoded on the same 8×4 ADRES instance with and without threading.

TABLE 1

Clock cycle count of single and dual threaded MPEG2 on the same architecture

| frame number | single-thread cc count | dual-thread cc count | single-thread decoding time | dual-thread decoding time | speed-up |
| --- | --- | --- | --- | --- | --- |
| 1 | 1874009 | 1802277 | | | |
| 2 | 2453279 | 2293927 | 579270 | 491650 | 15.1% |
| 3 | 3113150 | 2874078 | 659871 | 580151 | 12.1% |
| 4 | 3702269 | 3374421 | 589119 | 500343 | 15.1% |
| 5 | 4278995 | 3861978 | 576726 | 487557 | 15.5% |

The cc count column shows the clock count of the overall execution time when an image frame is decoded, while the decoding time column shows the clock count between two frames are decoded. The dual-threaded MPEG2 is about 12-15% faster than the single-thread MPEG2 for the following reasons.

Both IDCT and MC algorithm have high loop-level parallelism, thus can optimally utilize the single-threaded 8×4 architecture. When scheduled on the ×4 architecture as threads, the IPCs of both algorithms are reduced by half due to the halved array size, thus the overall IPCs of the non-threaded and the threaded MPEG2 are nearly the same. As mentioned earlier, when the ADRES' size is increased to certain extent, the scheduling algorithm has difficulty exploring parallelism in the applications and using the ADRES array optimally. It is clear that doubling/quadrupling the size of the ADRES array or choosing low-parallelism algorithm for threading will result in more speed-up.

As observed, the marginal performance gain is mostly achieved from he ease of modulo-scheduling on the smaller architecture. When an application is scheduled on a larger CGA, many redundant instructions are added into the kernel for routing purpose. Now the IDCT and MC kernels are scheduled on a half-CGA partition instead of the whole ADRES, even if the overall IPC of the application is not improved much, the amount of redundant instructions added during scheduling for placement and routing purpose has been greatly reduced.

By carrying out the dual-threading experiment on MPEG2 decoding algorithm, ample knowledge on the MT-ADRES architecture has been gained. The simulation results show that the MPEG2 has gain 12-15% of speed up. The results so far demonstrate that the threading approach is adequate for the ADRES architecture, is practically feasible, and can be scaled to a certain ex-tend. So far, the only extra hardware cost added onto ADRES is a second control unit, the size of which can be neglected for an ADRES larger than 3×3.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A coarse grain reconfigurable signal processing device adapted for simultaneous processing of at least two process threads in a multiprocessing manner, the device comprising:
   a plurality of functional units capable of executing word- and subword-level operations on data;
   routing resources for interconnecting the plurality of functional units, the routing resources supporting a plurality of dynamically switchable interconnect arrangements, at least one of the interconnect arrangements interconnecting the plurality of functional units into at least two non-overlapping partitions each with a pre-determined topology, each of the partitions or a combination of partitions being configured to process a respective one of the process threads, each of the partitions comprising two or more of the functional units;
   a plurality of configurations being stored in the coarse grain reconfigurable signal processing device, wherein the configurations control the behavior of the coarse grain reconfigurable signal processing device by selecting operations and by controlling the routing resources, wherein each of the dynamically switchable interconnect arrangements is selectable by loading a corresponding one of the configurations; and
   at least two control modules, each control module being assigned to one of the partitions for control thereof.

2. The coarse grain reconfigurable signal processing device according to claim 1, further comprising a plurality of data storages, wherein the routing resources interconnect the plurality of functional units and the plurality of data storages.

3. The coarse grain reconfigurable signal processing device according to claim 1, further comprising a data storage in which an application code is stored, the application code defining a process comprising the at least two process threads and being executable by the partitions, and wherein the routing resources are adapted for dynamically switching between interconnect arrangements at pre-determined points in the application code.

4. The coarse grain reconfigurable signal processing device according to claim 1, wherein the routing resources are adapted for dynamically switching interconnect arrangements depending on data content of a running application.

5. The coarse grain reconfigurable signal processing device according to claim 4, wherein the routing resources comprise multiplexing and/or demultiplexing circuits.

6. The coarse grain reconfigurable signal processing device according to claim 5, the coarse grain reconfigurable signal processing device having a clock, wherein the multiplexing and/or demultiplexing circuits are adapted to be configured with settings for dynamically switching interconnect arrangements, wherein the settings are changeable every clock cycle.

7. The coarse grain reconfigurable signal processing device according to claim 1, further comprising at least one global storage shared between a plurality of functional units.

8. The coarse grain reconfigurable signal processing device according to claim 1, further comprising at least two different types of functional units.

9. The coarse grain reconfigurable signal processing device according to claim 1, wherein at least another of the interconnect arrangements interconnects the plurality of functional units into a single partition under control of a single control module.

10. The coarse grain reconfigurable signal processing device according to claim 9, wherein at least one of the at least two control modules is a part of a global control unit for use in an interconnect arrangement with a single partition.

11. The coarse grain reconfigurable signal processing device according to claim 10, wherein in at least one interconnect arrangement with a single partition, at least one of the control modules drives control signals of all the functional units by having at least one other control module to follow it.

12. The coarse grain reconfigurable signal processing device according to claim 1, adapted for re-using at least part of the control modules assigned to the partitions in an interconnect arrangement with a plurality of non-overlapping partitions in the control module used in an interconnect arrangement with a single partition.

13. A method of executing an application on a coarse grain reconfigurable signal processing device, the method comprising:
   executing an application on a coarse grain reconfigurable signal processing device as a single process thread under control of a primary control module, the device comprising a plurality of functional units capable of executing word- and subword-level operations on data, routing resources for interconnecting the plurality of functional units, and a plurality of configurations being stored in the device, wherein the routing resources support a plurality of dynamically switchable interconnect arrangements, the interconnect arrangements comprising a first interconnect arrangement interconnecting the plurality of functional units into at least two non-overlapping partitions each with a pre-determined topology, each of the partitions comprising two or more of the functional units, wherein each of the dynamically switchable interconnect arrangements is selectable by loading a corresponding one of the configurations; and
   loading one of the configurations corresponding to the first interconnect arrangement to dynamically switch the coarse grain reconfigurable signal processing device into a device with at least two non-overlapping partitions; and
   splitting a portion of the application in at least two process threads, each process thread being executed simultaneously as a separate process thread on one of the partitions, each partition being controlled by a separate control module.

14. The method according to claim 13, wherein the switching of the coarse grain reconfigurable signal processing device into a device with at least two partitions is determined by a first instruction in application code determining the application.

15. The method according to claim 14, wherein the first instruction comprises a starting address of the instructions of each of the separate process threads.

16. The method according to claim 13, further comprising:
   dynamically switching back the coarse grain reconfigurable signal processing device into a device with a single partition; and
   synchronizing the separate control modules and joining the at least two threads of the application into a single process thread, the single process thread being executed as a process thread on the single partition under control of the synchronized control modules.

17. The method according to claim 16, wherein switching back the coarse grain reconfigurable signal processing device into a device with a single partition is determined by a second instruction in application code determining the application.

18. The method according to claim 17, wherein the second instruction comprises a starting address of the instructions to be executed as the single process thread.

19. The method according to claim 13, wherein the single control module re-uses at least one of the separate control modules when executing the application as a single process thread.

20. The method according to claim 13, wherein, in an interconnect arrangement with a single partition, one of the separate control modules drives control signals of substantially all the functional units by having the other control modules to follow it.

21. A computer-readable medium having stored thereon a computer program which, when being executed on a computer, performs the method according to claim 13.

22. A method of compiling an application source code to obtain compiled code being executable on a coarse grain reconfigurable signal processing device, the method comprising:
   inputting an application source code; and
   generating compiled code from the application source code,
   wherein generating the compiled code comprises:
      including, in the compiled code, a first instruction for configuring a coarse grain reconfigurable signal processing device for simultaneous execution of multiple process threads and for starting the simultaneous execution of the process threads, the device comprising a plurality of functional units capable of executing word- and subword-level operations on data, routing resources for interconnecting the plurality of functional units, and a plurality of configurations being stored in the device, wherein the routing resources support a plurality of dynamically switchable interconnect arrangements, the interconnect arrangements comprising a first interconnect arrangement interconnecting the plurality of functional units into at least two non-overlapping partitions each with a pre-determined topology, each of the partitions comprising two or more of the functional units, wherein each of the dynamically switchable interconnect arrangements is selectable by loading a corresponding one of the configurations, wherein the first instruction configures the device to the first interconnect arrangement, and
      including a second instruction to end the simultaneous execution of the multiple process threads such that when the last of the multiple process threads decodes this instruction, the coarse grain reconfigurable signal processing device is configured to continue execution in unified mode.

23. The method according to claim 22, further comprising providing an architectural description of the coarse grain reconfigurable signal processing device, the architectural description comprising descriptions of pre-determined interconnect arrangements of functional units forming partitions.

24. The method according to claim 23, wherein the providing of the architectural description comprises providing a separate control module per partition.

25. The method according to claim 22, wherein the first instruction comprises the start address of instructions of each of the multiple process threads.

26. The method according to claim 22, wherein the second instruction comprises the start address of instructions to be executed in unified mode after the execution of the multiple process threads.

27. The method according to claim 22, wherein the generating of the compiled code comprises:
  partitioning the application source code, thus generating code partitions;
  labeling the mode and the partition wherein the code partitions are to be executed;
  separately compiling each of the code partitions; and
  linking the compiled code partitions into a single executable code file.

28. A computer-readable medium having stored thereon a computer program which, when being executed on a computer, performs the method according to claim 22.

29. A method of adjusting an application to be executed on a coarse grain reconfigurable signal processing device, the method comprising:
  performing exploration of various partitionings of the application to be executed on a coarse grain reconfigurable signal processing device, the device comprising a plurality of functional units capable of executing word- and subword-level operations on data, routing resources for interconnecting the plurality of functional units, and a plurality of configurations being stored in the device, wherein the routing resources support a plurality of dynamically switchable interconnect arrangements, the interconnect arrangements comprising a first interconnect arrangement interconnecting the plurality of functional units into at least two non-overlapping partitions each with a pre-determined topology, each of the partitions comprising two or more of the functional units, wherein each of the dynamically switchable interconnect arrangements is selectable by loading a corresponding one of the configurations,
  wherein performing the exploration comprises changing an instance of an architectural description of the coarse grain reconfigurable signal processing device for exploring the interconnect arrangements of the coarse grain reconfigurable signal processing device by loading one of the plurality of configurations.

30. The method according to claim 29, wherein exploring interconnect arrangements of the coarse grain reconfigurable signal processing device comprises exploring dynamically switching between an interconnect arrangement having a single partition under control of a single control module and an interconnect arrangement having at least two partitions each under control of a separate control module.

31. A computer-readable medium having stored thereon a computer program which, when being executed on a computer, performs the method according to claim 29.

32. A coarse grain reconfigurable signal processing device adapted for simultaneous processing of at least two process threads in a multiprocessing manner, the device comprising:
  means for executing word- and subword-level operations on data;
  means for interconnecting the executing means, the interconnecting means supporting a plurality of dynamically switchable interconnect arrangements, at least one of the interconnect arrangements interconnecting the executing means into at least two non-overlapping partitions each with a pre-determined topology, each of the partitions comprising two or more of the functional units, each of the partitions or a combination of partitions being configured to process a respective one of the process threads;
  means for controlling the behavior of the coarse grain reconfigurable signal processing device by selecting operations and by controlling the interconnecting means, wherein the behavior controlling means comprises a plurality of configurations being stored in the coarse grain reconfigurable signal processing device, wherein each of the dynamically switchable interconnect arrangements is selectable by loading a corresponding one of the configurations; and
  means for controlling the at least two non-overlapping partitions.

33. The coarse grain reconfigurable signal processing device according to claim 1, wherein two or more of the at least two partitions are configured to jointly process one of the process threads.

34. The coarse grain reconfigurable signal processing device according to claim 1, wherein the plurality of dynamically switchable interconnect arrangements comprise at least a first interconnect arrangement and a second interconnect arrangement different from the first interconnect arrangement, each of the first and the second interconnect arrangement interconnecting the plurality of functional units into at least two non-overlapping partitions.

* * * * *